US010726361B2

(12) United States Patent
An et al.

(10) Patent No.: US 10,726,361 B2
(45) Date of Patent: Jul. 28, 2020

(54) COLLABORATIVE WORKING OF BUSINESS PROCESS MANAGEMENT METHODS

(75) Inventors: Ren Jing An, Beijing (CN); Liu Chao Jun, Beijing (CN); Ma Xi Jun, Beijing (CN); Hou Xiao Qiang, Beijing (CN); Yin Rui, Beijing (CN); Ping Yuan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 720 days.

(21) Appl. No.: 12/690,982

(22) Filed: Jan. 21, 2010

(65) Prior Publication Data

US 2010/0185478 A1    Jul. 22, 2010

(30) Foreign Application Priority Data

Jan. 22, 2009    (CN) .......................... 2009 1 0005959

(51) Int. Cl.
*G06Q 10/06*    (2012.01)
*G06Q 10/10*    (2012.01)
(52) U.S. Cl.
CPC .......... *G06Q 10/06* (2013.01); *G06Q 10/067* (2013.01); *G06Q 10/103* (2013.01); *G06Q 10/063* (2013.01)

(58) Field of Classification Search
CPC .... G06Q 10/06; G06Q 10/067; G06Q 10/103; G06Q 10/063
USPC ..................... 717/100, 140; 705/7, 348, 301
See application file for complete search history.

(56) References Cited

U.S. PATENT DOCUMENTS

| 7,519,976 | B2 | 4/2009 | Blevins | |
|---|---|---|---|---|
| 7,835,933 | B2 | 11/2010 | Casati et al. | |
| 8,069,071 | B2 | 11/2011 | Kall et al. | |
| 8,521,570 | B2 | 8/2013 | Sadiq | |
| 2004/0162741 | A1* | 8/2004 | Flaxer et al. | 705/7 |
| 2005/0262112 | A1 | 11/2005 | Moore | |
| 2006/0241956 | A1 | 10/2006 | Levy et al. | |
| 2007/0135936 | A1* | 6/2007 | Dumas et al. | 700/29 |
| 2007/0179822 | A1 | 8/2007 | Benayon et al. | |
| 2007/0266377 | A1 | 11/2007 | Ivanov | |

* cited by examiner

*Primary Examiner* — Gregory J. Toatley, Jr.
*Assistant Examiner* — Lynda Dinh
(74) *Attorney, Agent, or Firm* — Cuenot, Forsythe & Kim, LLC

(57) ABSTRACT

The collaborative working of process-oriented and event-based business process management (BPM) methods in a service-oriented architecture (SOA) is supported. The execution models of the business process include process-oriented execution models and event-based execution models. The process-oriented execution models and the event-based execution models are executed at runtime. A bridge implements the interaction between the process-oriented runtime execution and the event-based runtime execution.

14 Claims, 7 Drawing Sheets

COLLABORATIVE WORKING OF BUSINESS PROCESS MANAGEMENT METHODS

BACKGROUND

Field of the Invention

The present invention generally relates to service-oriented architecture (SOA), and more particularly relates to a system and method for supporting the collaborative working of process-oriented and event-based business process management (BPM) methods in a service-oriented architecture (SOA).

Description of the Related Art

Business process management (BPM) is a SOA management method focused on aligning organizations with the wants and needs of clients. BPM is also a holistic management information technology (IT) approach that promotes business effectiveness and efficiency while striving for innovation, flexibility and integration through technology. With advanced workflow technology, BPM performs an omni-directional management on enterprises from the aspect of business process, and supports enduring improvements of business process. Its core idea is to provide a unified modeling, executing, and monitoring environment for various businesses within an enterprise and among enterprises. It is therefore a "process optimization" process. The advantages of BPM are as followed: reducing the mismatch between business requirements and IT systems; improving the productivity of employees and reducing operating cost; improving the mobility and flexibility of enterprises; and reducing development cost.

In the BPM field, BPM leads to business innovation and optimization by implementing business strategies through modeling, developing, deploying, and managing business processes throughout the entire production lifecycle. A business process can refer to a collection of related, structured activities that help produce a service or product that meets the needs of a client. Although the initial focus of BPM was on the IT automation of mechanistic business processes, it has since been extended to integrate human-driven processes in which human interaction takes place in series or parallel with the mechanistic processes. A common form is where the individual steps in the business process which require human intuition knowledge or judgment to be performed are assigned to the appropriate members in an organization. Thus, BPM may be regarded as the backbone of enterprise content management.

Traditionally, a process-oriented method may be adopted where the business process is modeled as a network of activities. This network of activities can be constructed as a directed graph in which the nodes in the graph represent the activities or tasks that are performed, denoting different steps of the process. An activity may need human interaction or be fully automatic. For an activity that needs human interaction, a character may be defined in the process to identify who is allowed to interact with the process herein. The edges of the graph, i.e. the control connectors, describe the potential sequence of the execution of the activities. In industry there are several process definition methods, such as BPMN, XPDL, BPEL.

A brief architecture of a process-oriented BPM method in the prior art is described with respect to FIG. 1. First, requirement analysis and modeling 120 is performed on the process requirements 110 by modelers and business analysts, thereby producing process models 121. Then at the IT layer, the implementation 130 is performed on the process models 121 by integration developers and application developers. During the implementation process, the existing services and existing components are integrated through interaction glue so that each process model can be better suitable for a specified condition, and process flows 131 are produced. Afterwards, in the business process runtime infrastructure (operating environment) 140, the process flows 131 are executed. When the human interaction or decision-making is needed, related staff can participate in the execution process. Further, the execution of the runtime environment can be managed by administrators. During the execution of the business process, it is also needed to perform monitoring and analysis 150 on the execution of the process flows 131, so as to calculate critical performance indexes and obtain process improvement feedbacks with respect to the execution of the process flows 131. These process improvement feedbacks are transferred to the phase of requirement analysis and modeling 120 so that the modelers and business analysts can further improve the process models 121 according to the feedbacks. In this way, the "process optimization" process of BPM can be implemented, which makes the whole system more efficient and flexible.

Recently, along with the development of BPM, event-based architecture has become an emerging technology. An event-based application provides the ability to sense when an event message occurs or does not occur, indicating that an actionable business situation has occurred. Also an event-based application provides the ability to coordinate the right responses (actions) at the right time.

The features of process-oriented BPM methods are intuitive, explicit, and easy to model, but are not conducive to modification, and limited to information access. Although the features of event-based BPM methods are loosely-coupled, easy to modify, and able to access all information in theory, they are not intuitive enough and complicated to model. The forms and viewing angles of the two modes are different. Sometimes the process-oriented methods are easier; sometimes the event-based methods are easier. Therefore, modelers and business analysts can adopt different methods based on particular situations. For example, the processes of opening a bank account and insurance claim are typical process-oriented implementations. Under some circumstances, it is necessary to trigger the execution of some process or the rejection of the process by an event. Then event-based implementations are needed, for example, ATM withdrawal (it may be necessary to consider the account balance, daily maximum withdrawal amount, etc.), money laundering investigation process (it may be necessary to consider the trading records of one specified customer during a time period and conduct an overall analysis).

In practical implementation, how to make the two styles of SOA applications smoothly and closely work together, so that an enterprise can have a better control and management of the end-to-end process, is a problem. For example, for some process that may be implemented by process-oriented BPM methods, some parts in the process may be more suitable for handling by event-based methods; or, some methods for implementing some parts in the process, which are event-based, have already existed inside or outside the enterprise. At this point, it is expected to split the various parts of the SOA application into two parts, process-oriented and event-based, thereby further improving the working efficiency.

The above problem relates to model transformation. Prior art tools and methods to solve such problem are monolithic transformation processes, i.e., either the transformation from process-oriented models to process-oriented models, or from process-oriented models to event-based models. In an actual SOA application, such a method is expected, which can implement a hybrid of process-oriented and event-based models, thereby supporting the collaborative working of process-oriented and event-based BM methods.

BRIEF SUMMARY

In the first aspect of the present invention, there is proposed a system for supporting the collaborative working of process-oriented and event-based business process management methods in a service-oriented architecture, wherein the execution models of the business process comprise process-oriented execution models and event-based execution models. In this embodiment, the system comprises a process-oriented runtime module for executing the process-oriented execution models at runtime, an event-based runtime module for executing the event-based execution models at runtime, and a bridge for implementing the interaction between the process-oriented runtime module and the event-based runtime module at runtime.

In a second aspect of the present invention, there is proposed a method for supporting the collaborative working of process-oriented and event-based business process management methods in a service-oriented architecture. In this embodiment, the execution models of the business process comprise process-oriented execution models and event-based execution models. The method may comprise executing the process-oriented execution models at runtime, executing the event-based execution models at runtime, and implementing the interaction between the process-oriented execution models and the event-based execution models at runtime.

In a third aspect of the present invention, there is proposed a process model transformation method for business process management (BPM), wherein during the process of business process management, the requirement analysis and modeling is performed on the process requirements of the business process, thereby producing process models. The process model transformation method may comprise marking the process models to indicate which parts of the process models are to be transformed into the process-oriented execution models and which parts into the event-based execution models. The parts that are marked as process-oriented in the process models are transformed into the process-oriented execution models. The parts that are marked as event-based in the process models can be transformed into the event-based execution models.

In a fourth aspect of the present invention, there is proposed a computer program product which may be loaded on a computer and include a program code tool, wherein when the computer program product is executed on the computer, the program code tool adapts to perform all steps of the method for supporting the collaborative working of process-oriented and event-based business process management methods in a service-oriented architecture.

According to a system and method in accordance with the present invention, the end-to-end BPM can be implemented for both process-oriented and event-based SOA applications. Different parts of the end-to-end business process can be fulfilled respectively by taking advantage of process-oriented and event-based according to the particular situation. It is possible to automatically transform a business model into an IT model. Different workflows can be enabled to smoothly work together at runtime. Furthermore, since the process-oriented and event-based execution models are integrated at runtime, the original BPM model can be executed collaboratively under different architectures, so that the advantages of different architectures can be utilized to the greatest extent.

BRIEF DESCRIPTION OF THE SEVERAL VIEWS OF THE DRAWINGS

Novel features believed to characterize the invention are set forth in the appended claims. However, the invention itself and its utilization mode, together with objects and advantages, will be best appreciated from the reading of the following detailed description of the illustrative embodiments taken in conjunction with the drawings, in which:

It is noted that the same or similar labels designate the same or similar elements or components throughout the figures.

DETAILED DESCRIPTION

The exemplary embodiments of the invention will be described below in conjunction with the accompanying figures. For clarity and simplicity, not all features of the actual implementation are described in the specification. However, it should be appreciated that many implementation-specific decisions may be made in the procedure of developing any of such actual embodiments in order to realize the particular objectives of developers, for example complying with those limiting conditions in related to systems and businesses, wherein the limiting conditions may be varied depending on the implementation. Further, it should be appreciated that although the development effort may be complicated and time-consuming, such development effort may only be a routine task for those skilled in the art that benefit from this disclosure.

Moreover, it is further noted that, in order not to obscure the invention by those unnecessary details, only the apparatus structures and/or processing steps related to the scheme according to embodiments of the invention are shown in the accompanying figures, while other details not relative to embodiments of the invention are omitted.

Figure 1:
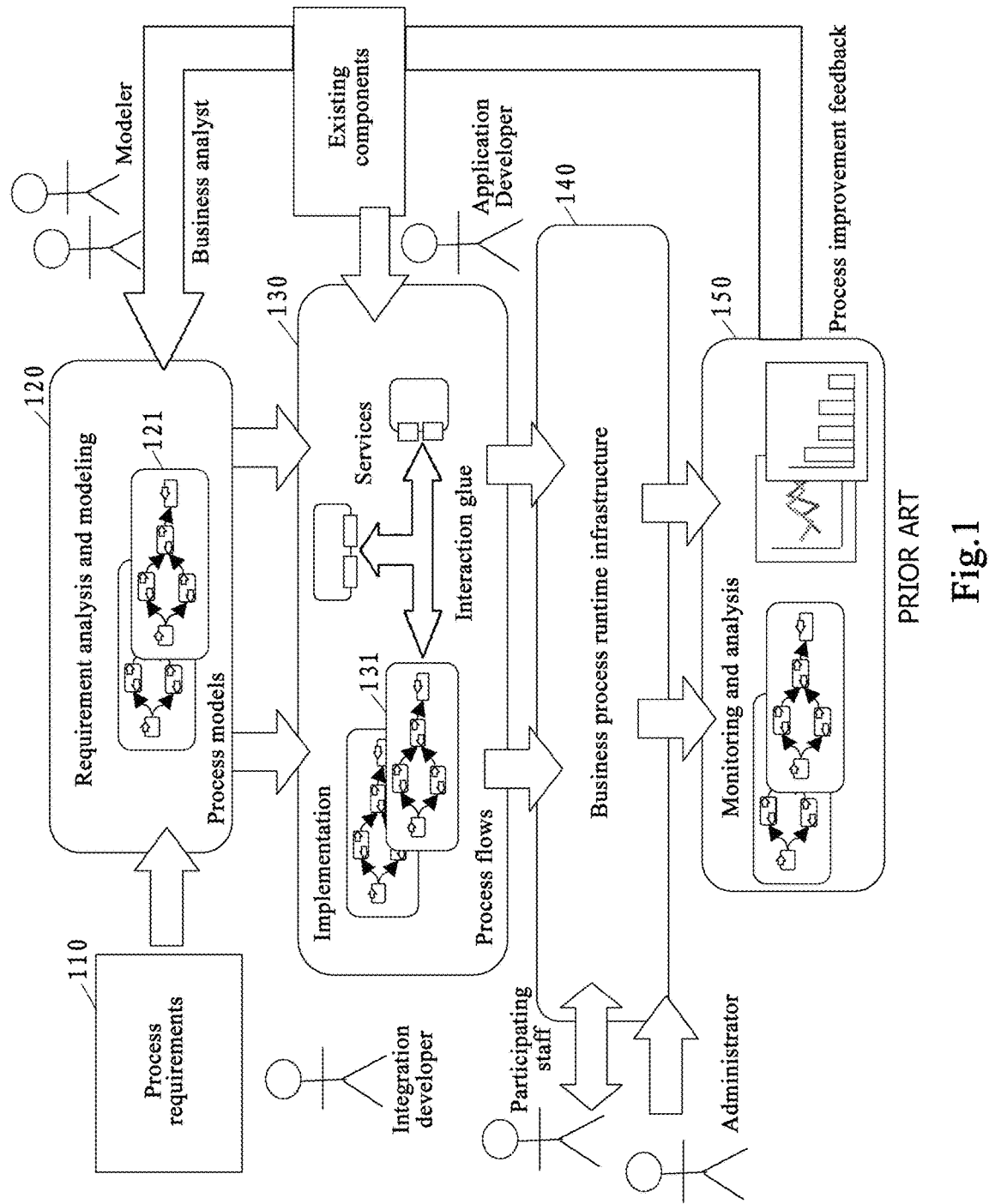
FIG. 1 describes a brief architecture of a prior art process-oriented BPM method.

According to an embodiment of the present invention, in order to enable the BPM architecture to support both process-oriented and event-based methods, the process-oriented BPM method as shown in FIG. 1 can be extended. That is, according to the needs of the particular implementations, the business process is transformed into process-oriented execution models in part, and into event-based execution models in part. Meanwhile, at runtime, a bridge is employed to associate and coordinate the process-oriented runtime engine and the event-based runtime engine so as to complete the execution of the business process models together, thereby enhancing the system performance and flexibility.

Figure 2:
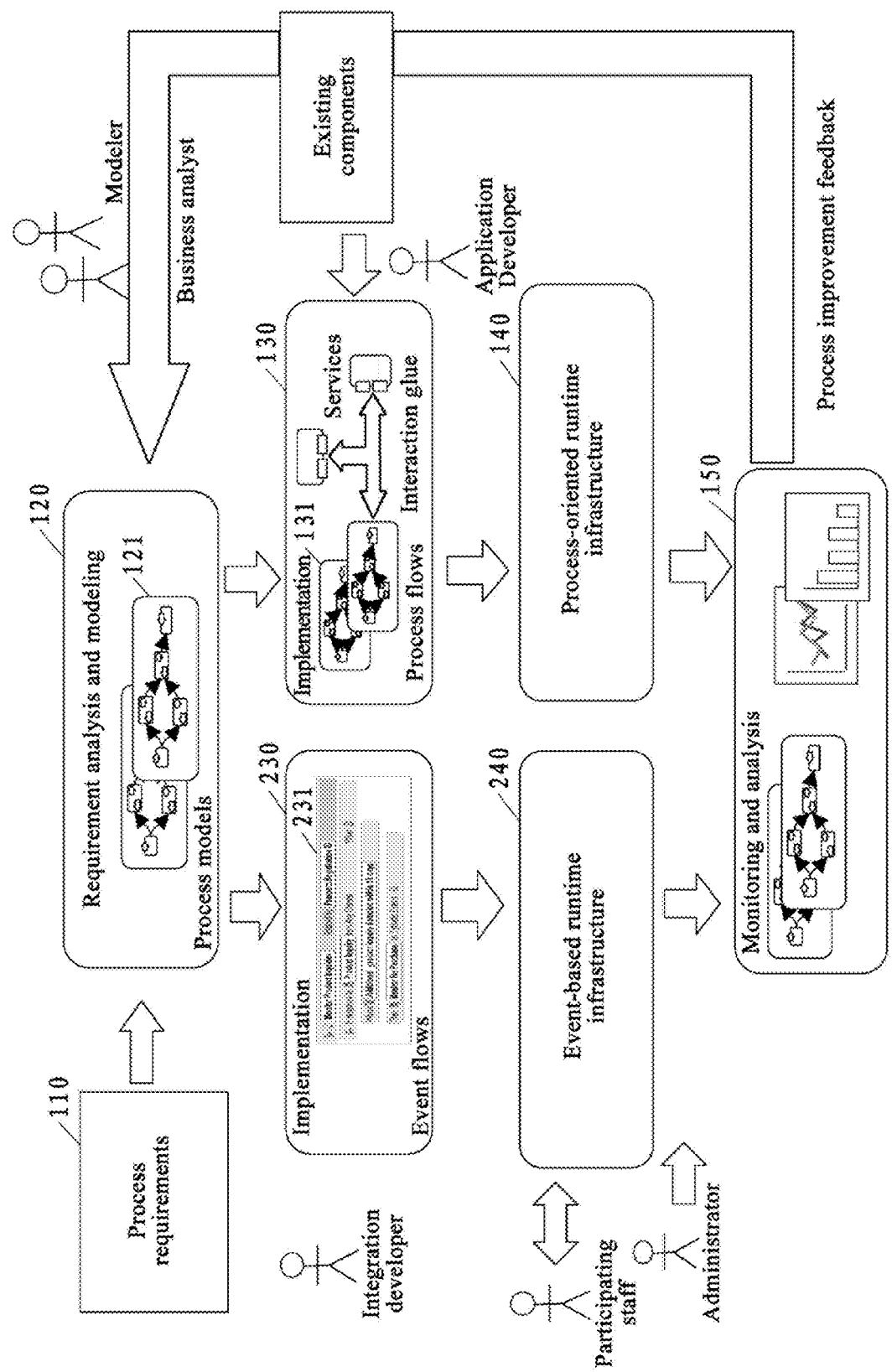
FIG. 2 describes a brief architecture supporting both process-oriented and event-based BPM methods according to an embodiment of the present invention.

A brief architecture supporting both process-oriented and event-based BPM methods according to an embodiment of the present invention is described with respect to FIG. 2. The business process as shown in FIG. 2 can be transformed into a hybrid of process-oriented and event-based execution models. In particular, FIG. 2 can support process-oriented methods, i.e. the same blocks 110-150 as in FIG. 1, which are not described in detail herein. Moreover, the BPM method as shown in FIG. 2 can also support event-based methods, i.e. the blocks 230 and 240 that are executed in parallel with the blocks 130 and 140. That is to say, according to different particular implementations, it is possible to implement (130) some parts of the process models 121 into process flows 131, and implement (230) other parts into event flows 231. Afterwards, in the business process runtime infrastructure (operating environment) 140, the process flows 131 are performed; while in the event-based runtime infrastructure (operating environment) 240, the event flows 231 are performed. The business process runtime infrastructure 140 can also interact with the event-based runtime infrastructure 240, so as to successfully complete the end-to-end business process. Also, the monitoring and analysis 150 is performed on the execution of the process flows 131 and the event flows 231 simultaneously, so as to calculate critical performance indexes and obtain process improvement feedbacks.

The BPM method of the embodiment as shown in FIG. 2 may include the following advantages: end-to-end BPM can be implemented for both process-oriented and event-based SOA applications; different parts of the end-to-end business process are fulfilled respectively by taking the advantages of process-oriented and event-based according to the particular situation; it is possible to automatically transform a business model into an IT model; and different workflows are enabled to smoothly work together at runtime.

Figure 3:
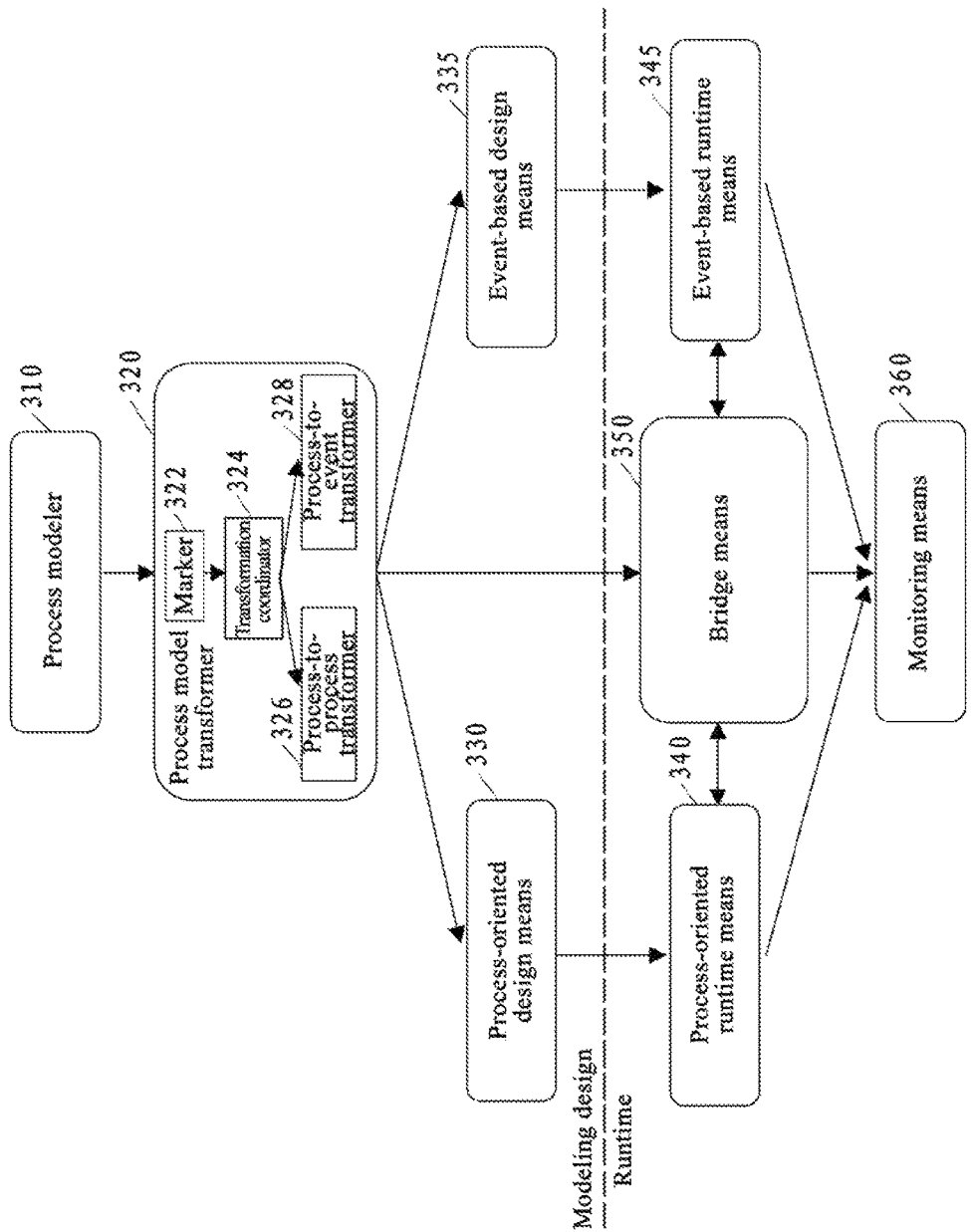
FIG. 3 illustrates a block diagram of a system for supporting the collaborative working of process-oriented and event-based business process management methods in a service-oriented architecture according to an embodiment of the present invention.

A block diagram of a system for supporting the collaborative working of process-oriented and event-based business process management methods in a service-oriented architecture according to an embodiment of the present invention is illustrated hereinbelow with respect to FIG. 3. As shown in FIG. 3, the system comprises: a process modeler 310, a process model transformer 320, a process-oriented design module 330, a process-oriented runtime module 340, an event-based design module 335, an event-based runtime module 345, a bridge 350, and a monitor 360.

In the system as shown in FIG. 3, the process modeler 310, the process model transformer 320, the process-oriented design module 330, and the event-based design module 335 can compose a system for modeling design. The system composed by the process-oriented runtime module 340, the event-based runtime module 345, the bridge 350, and the monitor 360 can form a stand-alone runtime system, which is the runtime system for supporting the collaborative working of process-oriented and event-based business process management methods in a service-oriented architecture.

In particular, the process modeler 310 is configured to perform requirement analysis and modeling on the process requirements of the business process, generate process models, and transfer the process models to the process model transformer 320.

The process model transformer 320 is configured to transform various parts of the business process models into the process-oriented or event-based execution models respectively. As further shown in FIG. 3, the process model transformer 320 can comprise a marker 322, a transformation coordinator 324, a process-to-process transformer 326, and a process-to-event transformer 328.

In particular, the marker 322 can allow marking the received process models to indicate which parts of the process models are to be transformed into process-oriented execution models and which parts into event-based execution models. In one embodiment, the received process models can be marked by related staff (e.g. the integration developers) with the marker 322. In another embodiment, the process models can be automatically marked with the marker 322 according to pre-defined rules. The pre-defined rules can define what kind of process models will be transformed into the process-oriented execution models, and what kind of process models into the event-based execution models. It can be appreciated by those skilled in the art that it is also practical to mark the process models in conjunction with both automatic and manual manners. The marker 322 can also be configured for annotating other essential information, also referred to as meta-information (e.g., correlation set information and transformation rule information), with respect to the process models. The contents related to such information will be described in detail hereinafter.

The marker 322 transfers the marked process models to the transformation coordinator 324. The transformation coordinator 324 pre-processes the marked process models. For example, according to the marking, the process models are divided into process-oriented and event-based. Then the association relationship between them, or the interaction data and its format necessary for the interaction between them, is determined. Thus, the transformation coordinator 324 coordinates the specified transformers (the process-to-process transformer 326, process-to-event transformer 328) to perform transformation operations on different parts of the process models.

Via the coordination of the transformation coordinator 324, the process-to-process transformer 326 transforms the parts that are marked as process-oriented in the process models into the process-oriented execution models, while the process-to-event transformer 328 transforms the parts that are marked as event-based in the process models into the event-based execution models. In some situations, the marked process-oriented execution models and event-based execution models can be associated seamlessly together, so that the pre-processing effort of the transformation coordinator 324 need not be performed.

The process-oriented design module 330 is configured for designing the process-oriented execution models based on the particular situation of the business process, for example, integrating the execution models with the existing services and existing components. Similarly, the event-based design module 335 is configured for designing the event-based execution models based on the particular situation of the business process. The event-based runtime module 345 is configured for executing the event-based execution models at runtime. Since the process-oriented and event-based execution models are integrated at runtime, the original BPM models can be executed collaboratively under different architectures, so as to take advantage of different architectures.

Since these components execute different parts of the same process, the process-oriented runtime module 340 and the event-based runtime module 345 may need to interact with each other when necessary. For example, the related data of the event-based runtime module 345 can be transferred to the process-oriented runtime module 340 in the form of events, or vice versa, thereby implementing the data exchange between them. Therefore, according to an embodiment of the present invention, a bridge 350 is disposed between the process-oriented runtime module 340 and the event-based runtime module 345 to integrate the process-oriented runtime engine and the event-based runtime engine, thereby implementing the interaction between the process-oriented runtime module 340 and the event-based runtime module 345 at runtime. The bridge 350 also connects to the monitor 360 in order to provide the monitor 360 with the necessary data, i.e., reporting the processed data exchange to the monitor 360. The bridge 350 will be further described hereinafter.

The monitor 360 is configured for monitoring and analyzing the process-oriented runtime module 340, the event-based runtime module 345, and the bridge 350 between them at runtime, so as to calculate critical performance indexes and obtain process improvement feedbacks at runtime with respect to the process-oriented execution models and the event-based execution models, so that it is possible to further improve the process models generated by the process modeler 310 according to the feedbacks.

Figure 4:
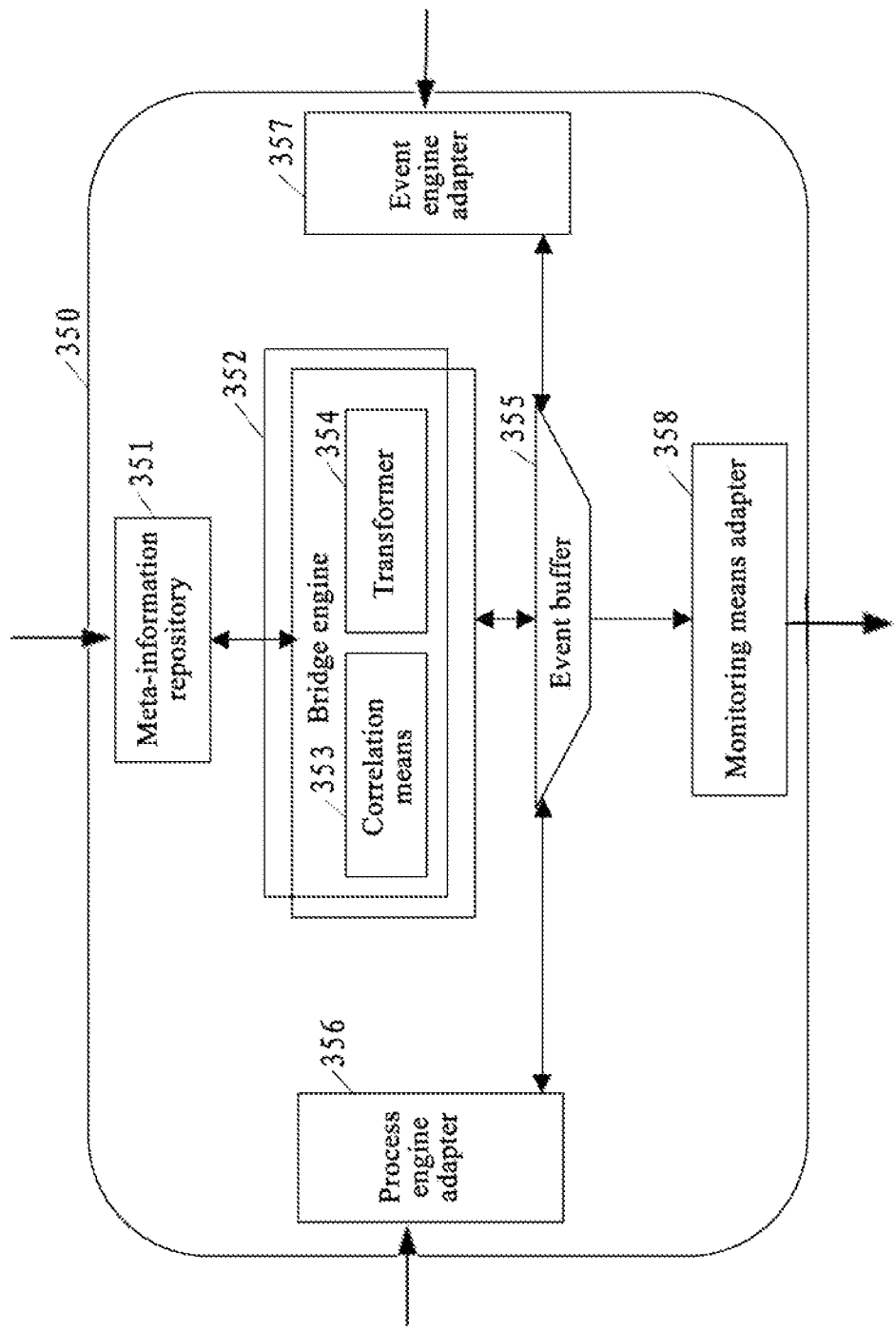
FIG. 4 illustrates a block diagram of the bridge according to an embodiment of the present invention.

A block diagram of the bridge 350 according to an embodiment of the present invention is illustrated hereinbelow with respect to FIG. 4. As shown in FIG. 4, the bridge 350 comprises a meta-information repository 351, a bridge engine 352, an event buffer 355, a process engine adapter 356, an event engine adapter 357, and a monitor adapter 358.

In particular, the meta-information repository 351 maintains the meta-information related to the event models (such as correlation set information and transformation rule information) and exchanges the above-mentioned information with the bridge engine 352. Because there may be a plurality of process instances when a plurality of different processes are existing at the same time and are executing, the correlation set information can uniquely identify each process instance so that an event received or sent by the bridge 350 can uniquely correspond to a specified process instance. The correlation set information can be saved in several fields in the process model. Furthermore, since the bridge 350 needs to receive/send events from/to the process-oriented runtime module 340 and the event-based runtime module 345, respectively, and these events may not be compatible with each other, the transformation rule information may be used for mapping events between the process-oriented runtime module and the event-based runtime module, so that the process-oriented runtime module and the event-based runtime module can understand the forms and contents of the events sent by the opposite party.

The bridge engine 352 further comprises a correlator 353 and a transformer 354. When there are process instances of a plurality of business processes, the correlator 353 correlates each event for interaction that is received or sent by the bridge 350 with the process instances via the correlation set information, thereby guaranteeing the event can uniquely correspond to a specified process instance. The transformer 354 transforms the events received from the process-oriented runtime module into the forms that the event-based runtime module understands according to the transformation rule information, or transforms the events received from the event-based runtime module into the forms that the process-oriented runtime module understands.

The event buffer 355 temporarily stores the events received from/sent to the process-oriented runtime module and the event-based runtime module, thereby guaranteeing that the event processing and communication are separated. The event buffer 355 interacts with the bridge engine.

The process engine adapter 356, the event engine adapter 357, and the monitor adapter 358 are configured for performing the interactions with the process-oriented runtime module, the event-based runtime module, and the monitor, respectively, and sending or receiving events while necessary.

Figure 5:
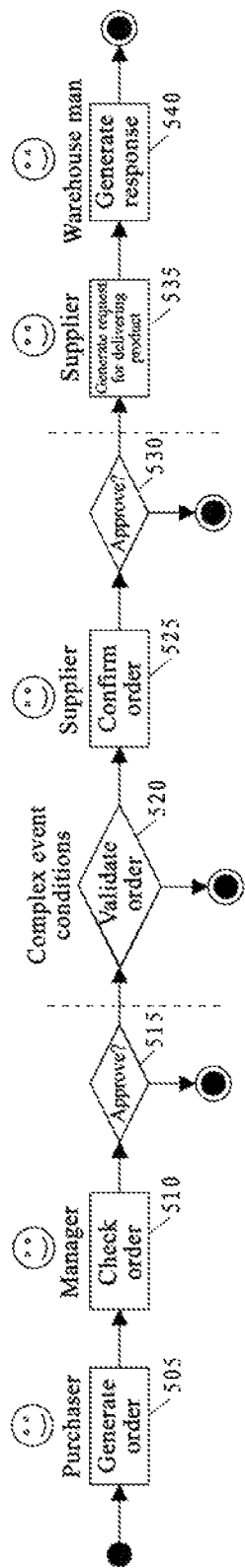
FIG. 5 describes a brief exemplary business process according to an embodiment of the present invention.

The detailed descriptions of the system for enabling the collaborative working of process-oriented and event-based BPM methods according to an embodiment of the present invention are provided hereinabove. In order to better understand the invention, a brief exemplary business process according to an embodiment of the present invention is described hereinafter with respect to FIG. 5. FIG. 5 illustrates a process-driven BPM model starting from a purchaser deciding to purchase a certain product to a warehouse employee delivering the product. In the process shown in FIG. 5, firstly, at Block 505, the purchaser generates an order for purchasing a certain product. At block 510, the manager receives and checks the order, and at Block 515, decides whether to approve the order. If the order is not approved, for example because there is an error in the order, then the process ends; if approved, then at Block 520, the order is verified (i.e. the order is validated) according to various complex event conditions, for example, whether the product in the order is a valid product, whether the quantity of the product in the order is appropriate, whether there is a great deal of same orders prior to this order, etc. If the order is invalid, the process ends. If the order is valid, then at Block 525, the supplier confirms the order, and at Block 530 decides whether to accept the order according to its own supply capability, for example the stock quantity, transportation capability, etc. If the supplier does not accept the order, the process ends; if accepts, then at Block 535, the supplier generates a request for delivering the product. At last, at Block 540, the warehouse employee generates a response for delivering the product according to the request from the supplier.

It can be seen from the above process that the process models of Blocks 520, 525, 530 are suitable for adopting event-based executing models, which can be triggered or adjusted through some particular events. Therefore, in the BPM implementation according to the present invention, it is expected to implement them as event-based execution models, and the remaining parts in the process as process-oriented execution models.

Thus, firstly, Blocks 520, 525, 530 are marked as to-be-transformed event-based models (the part between the two dashed lines in FIG. 5) by the marker 322 in the process model transformer 320, while the remaining parts are marked as to-be-transformed process-oriented models (the parts outside the two dashed lines in FIG. 5). Then the transformation coordinator 324 pre-processes the marked process models and coordinates the specified transformers (the process-to-process transformer 326, the process-to-event transformer 328) to perform transformation operations on different parts of the above process models.

Figure 6:
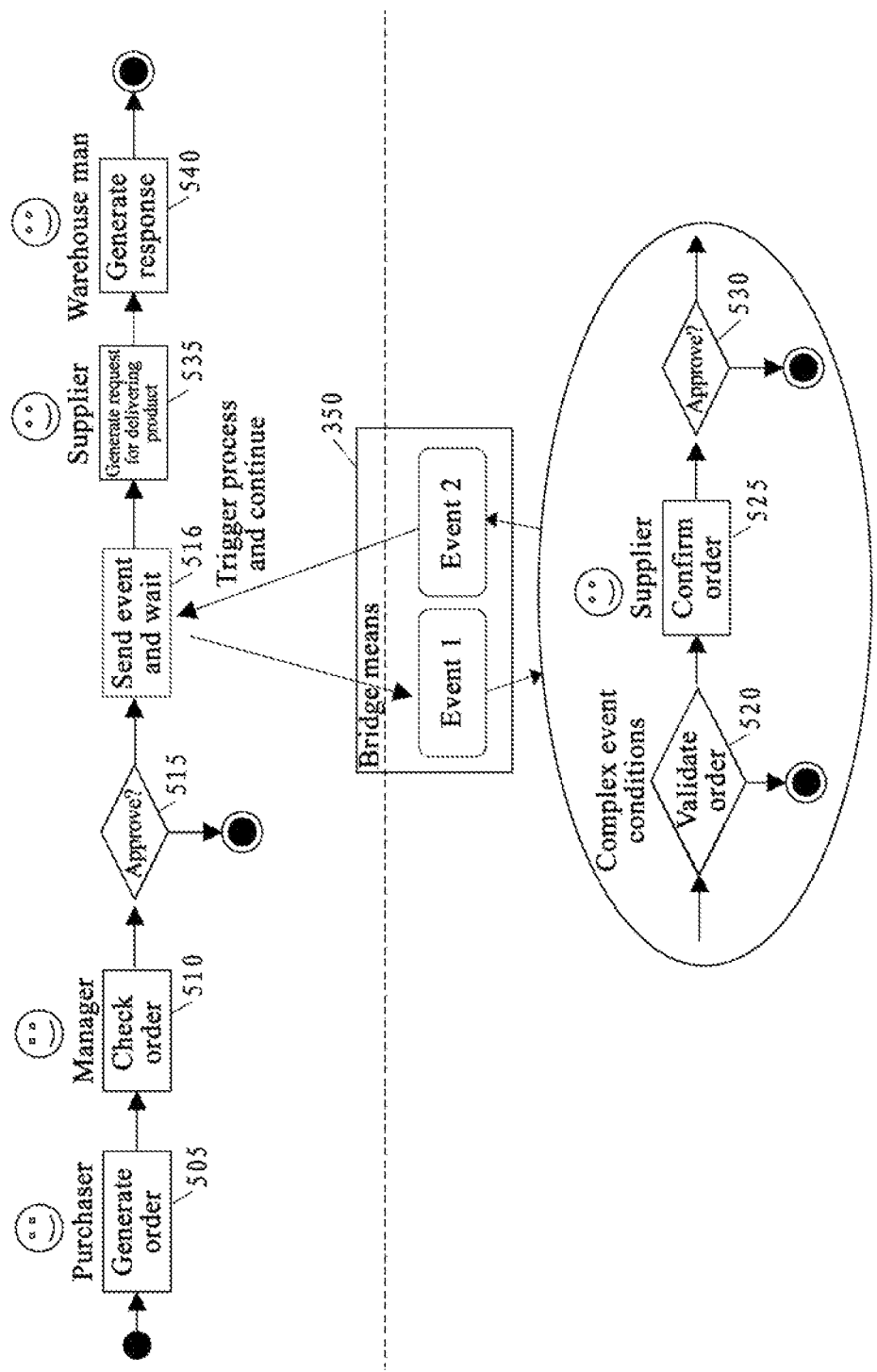
FIG. 6 illustrates a transformed BPM model according to an embodiment of the present invention, wherein the various parts of the BPM model are deployed into the process-oriented or event-based runtime environments respectively.

FIG. 6 illustrates a transformed BPM model according to an embodiment of the present invention, wherein the various parts of the BPM model are deployed into the process-oriented or event-based runtime environments respectively.

As shown in FIG. 6, the parts above the dashed line are transformed into the process-oriented execution models, while the parts below the dashed line are transformed into the event-based execution models. The bridge 350 is located between them, for integrating the process-oriented and event-based runtime engines, thereby supporting the interactions between them (usually in the form of events), in order to make them collaborate smoothly. After the manager approves the order (Block 515), the process proceeds to Block 516, sending an event (such as Event 1) to the bridge 350 and waiting for the event response. The bridge 350 receives Event 1 and sends it to the event-based execution models after transforming it into an event that the event-based execution models can understand. After the order is verified and confirmed (Blocks 520, 525, 530), an event (such as Event 2) is sent to the bridge 350. The bridge 350 receives Event 2, and sends it to the process-oriented execution models after transforming it into an event that the process-oriented execution models can understand. As a result, the process-oriented execution models continue to proceed, generating a request for delivering the product by the supplier (Block 535).

Figure 7:
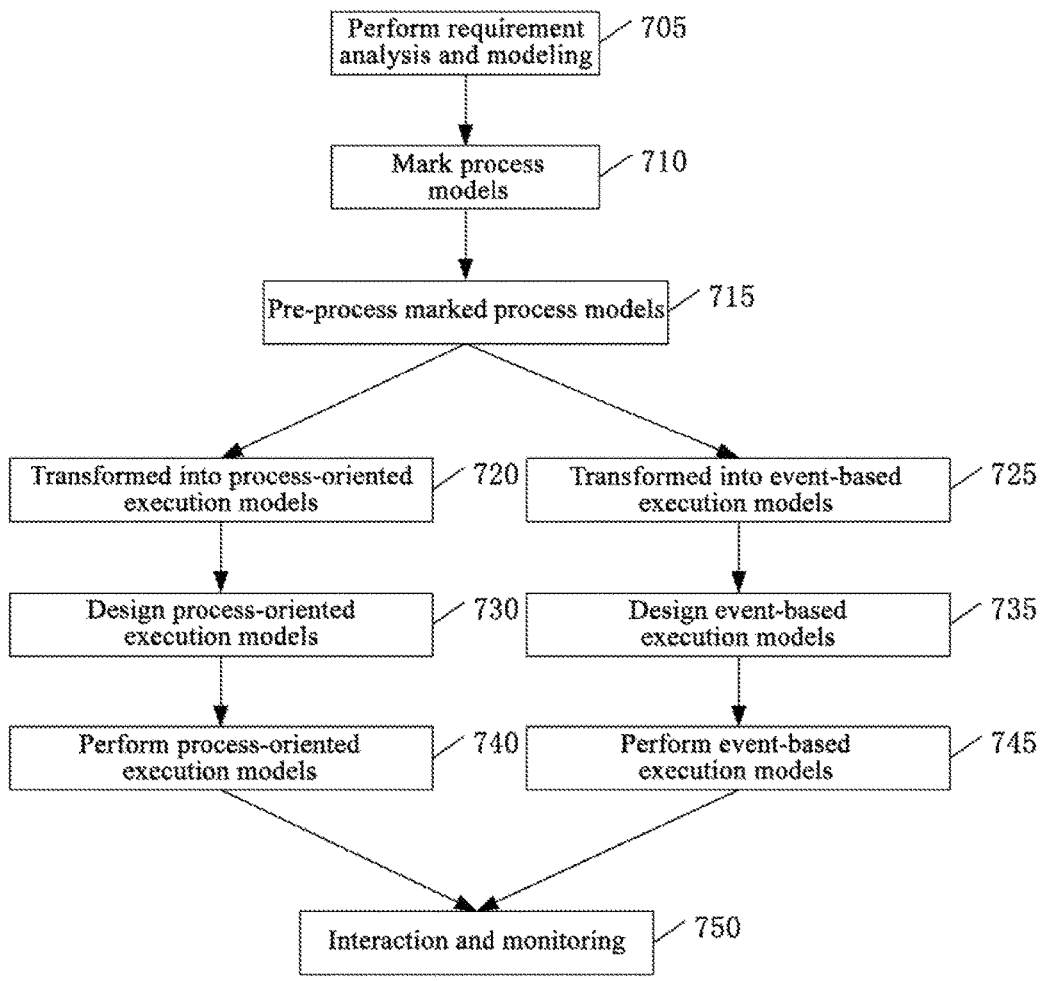
FIG. 7 illustrates a flowchart of a method for supporting the collaborative working of process-oriented and event-based business process management methods in a service-oriented architecture according to an embodiment of the present invention.

Under the same inventive concept, a flowchart of a method for supporting the collaborative working of process-oriented and event-based business process management methods in a service-oriented architecture according to an embodiment of the present invention is also illustrated with respect to FIG. 7.

As shown in FIG. 7, the method starts at Step 705, requirement analysis and modeling is performed on the process requirements of the business process, and process models are generated. Then, at Step 710, the process models are marked to indicate which parts of the process models are to be transformed into the process-oriented execution models and which parts into the event-based execution models. At Step 715, the marked process models are pre-processed, and the transformation operations are coordinated to be performed on different parts of the process models.

After Step 715, the method has two branches. At Step 720, the parts that are marked as process-oriented in the process models are transformed into the process-oriented execution models; and at Step 725, the parts that are marked as event-based in the process models are transformed into the event-based execution models. The marking of the process models can adopt the manners of manual, automatic, or the combination of both.

Then at Step 730, the process-oriented execution models are designed based on the particular implementation of the business process; and at Step 735, the event-based execution models are designed based on the particular implementation of the business process. Then at Step 740, the process-oriented execution models are executed at runtime; and at Step 745, the event-based execution models are executed at runtime.

At Step 750, the interaction between the process-oriented execution models and the event-based execution models is implemented at runtime, and the execution process of the process-oriented execution models, the execution process of the event-based execution models, and the interaction between the two execution models at runtime are monitored and analyzed, so as to calculate critical performance indexes and obtain process improvement feedbacks at runtime with respect to the process-oriented execution models and the event-based execution models. According to the process improvement feedback, the process models, which are generated in the step of performing requirement analysis and modeling on the process requirements of the business process and generating process models, are further improved. Although in FIG. 7 Step 750 is shown as being executed after Steps 740, 745, it does not represent a limitation on the execution sequence. In an actual implementation, these steps may all be executed at runtime.

Step 750 may further comprise correlating, when there are process instances of a plurality of business processes, with the process instances, interaction data for interaction that is received or sent in the process of implementing the interaction between the process-oriented execution models and the event-based execution models at runtime, thereby guaranteeing the interaction data uniquely corresponds to a specified process instance. Step 750 may also further comprise transforming the interaction data received in the process of executing the process-oriented execution models at runtime into the forms that the event-based execution models understand, or transforming the interaction data received in the process of executing the event-based execution models at runtime into the forms that the process-oriented execution models understand.

Step 750 may further comprise maintaining the meta-information related to the process models and temporarily storing the interaction data received from/sent to the process-oriented execution models and the event-based execution models. The meta-information may comprise correlation set information and transformation rule information. In an embodiment of the present invention, the meta-information is annotated with respect to the process models when marking the execution models.

The system and method for supporting the collaborative working of process-oriented and event-based business process management methods in a service-oriented architecture according to an embodiment of the present invention are described in detail hereinabove. As appreciated by a person with ordinary skill in the art, the present invention may be embodied as a method, a system, and/or a computer program product. Therefore, the present invention can be embodied in hardware, software, or a combination of software and hardware. Additionally, the present invention may be embodied as a computer program product contained on machine-readable media where the computer executable program instructions for programming a computer system to execute the process according to an embodiment of the invention are stored. The term "machine-readable media" used herein include any media that provide the computer system with instructions for execution. Such media may take various forms, including but not limited to non-volatile media, volatile media, and transmission media. Non-volatile media commonly comprise, for example, floppy disk, floppy magnetic disk, hard disk, magnetic tape, or any other magnetic media, CD-ROM or any other optical media, slotting card or any other physical media with hole pattern, PROM, EPROM, EEPROM, flash memory, any other memory chip or cartridge, or any other media that can be read by the computer system and are appropriate for storing instructions.

A data processing system suitable for storing and/or executing program code will include at least one processor coupled directly or indirectly to memory elements through a system bus. The memory elements may include local memory employed during actual execution of the program code, bulk storage, and cache memory which provides temporary storage of at least some program code in order to reduce the number of times code must be retrieved from bulk storage during execution.

Additionally, it should be appreciated that each block in the flow chart or block chart and the combination of some blocks may be implemented by some computer program instructions. These computer program instructions may be provided to a general purpose computer, a specific purpose computer, or a processor of other programmable data processing device, to produce a machine, in which these instructions, when executed by the computers or the processor of other programmable data processing device, can create the means for implementing the functions indicated by the blocks of the block chart and/or the flow chart.

Although the present invention has been presented and described specifically by reference to the preferred embodiments, it is not intended to be exhaustive or limited to the invention in the form disclosed. Many modifications on forms and details will be apparent to those of ordinary skill in the art without deviating from the spirit and scope of the invention. The embodiments were chosen and described in order to best explain the principles of the invention, the practical application, and to enable others of ordinary skill in the art to understand the invention for various embodiments with various modifications as are suited to the particular use contemplated.

We claim:

1. A computer-executed method for performing a computer-implemented operation, comprising:
   executing, using a process-oriented runtime engine, at least one process-oriented execution model;
   executing, in parallel with the at least one process-oriented execution model and using an event-based runtime engine, at least one event-based execution model; and
   facilitating, using a bridge disposed between the at least one process-oriented execution model and the at least one event-based execution model, an interaction between the at least one-oriented execution model and the at least one event-based execution model while these models are concurrently executing, wherein
   the computer-implemented operation is modeled by the combination of the at least one process-oriented execution model and the at least one event-based execution model,
   the bridge is configured to send events both to and from the at least one process-oriented execution model and the at least one event-based execution model, and
   the bridge transforms events sent between the at least one process-oriented execution model and the at least one event-based execution model to match the respective forms of the at least one process-oriented execution model and the at least one event-based execution model.

2. The method of claim 1, further comprising:
   evaluating the computer-implemented operation;
   generating, based upon the evaluation, a process model;
   transforming a first portion of the process model into the at least one process-oriented execution model; and
   transforming a second portion of the process model into the at least one event-based execution model, wherein
   the process model is transformed using:
      a marker configured to mark first and second parts of the process model,
      a process-to-process transformer for transforming the first parts into the at least one process-oriented execution model; and
      a process-to-event transformer for transforming the second parts into at least one event-based execution model.

3. The method of claim 1, wherein
   the at least one process-oriented execution model generates, during execution, process flows; and
   the at least one event-based execution model generations, during execution, event flows.

4. The method of claim 3, further comprising
   simultaneously monitoring and analyzing, using the bridge, the process flows and the event flows.

5. The method of claim 1, wherein
   a plurality of different processes are concurrently being executed, and
   the bridge correlates individual events with respective ones of the plurality of different process instances.

6. A computer-implemented data processing system configured to perform a computer-implemented operation, comprising:
   a computer hardware system configured to perform:
      executing, using a process-oriented runtime engine, at least one process-oriented execution model;
      executing, in parallel with the at least one process-oriented execution model and using an event-based runtime engine, at least one event-based execution model; and
      facilitating, using a bridge disposed between the at least one process-oriented execution model and the at least one event-based execution model, an interaction between the at least one-oriented execution model and the at least one event-based execution model while these models are concurrently executing, wherein
   the computer-implemented operation is modeled by the combination of the at least one process-oriented execution model and the at least one event-based execution model,
   the bridge is configured to send events both to and from the at least one process-oriented execution model and the at least one event-based execution model, and
   the bridge transforms events sent between the at least one process-oriented execution model and the at least one event-based execution model to match the respective forms of the at least one process-oriented execution model and the at least one event-based execution model.

7. The data processing system of claim 6, wherein the computer hardware system is further configured to perform:
   evaluating the computer-implemented operation;
   generating, based upon the evaluation, a process model;
   transforming a first portion of the process model into the at least one process-oriented execution model; and
   transforming a second portion of the process model into the at least one event-based execution model, wherein
   the process model is transformed using:
      a marker configured to mark first and second parts of the process model,
      a process-to-process transformer for transforming the first parts into the at least one process-oriented execution model; and
      a process-to-event transformer for transforming the second parts into at least one event-based execution model.

8. The data processing system of claim 6, wherein
   the at least one process-oriented execution model generates, during execution, process flows; and
   the at least one event-based execution model generations, during execution, event flows.

9. The data processing system of claim 8, wherein the computer hardware system is further configured to perform simultaneously monitoring and analyzing, using the bridge, the process flows and the event flows.

10. The data processing system of claim 6, wherein a plurality of different processes are concurrently being executed, and the bridge correlates individual events with respective ones of the plurality of different process instances.

11. A computer program product, comprising:

a computer hardware storage device having stored therein computer usable program code for performing a computer-implemented operation, the computer usable program code, which when implemented by a computer hardware system causes the computer hardware system to perform:

executing, using a process-oriented runtime engine, at least one process-oriented execution model;

executing, in parallel with the at least one process-oriented execution model and using an event-based runtime engine, at least one event-based execution model; and facilitating, using a bridge disposed between the at least one process-oriented execution model and the at least one event-based execution model, an interaction between the at least one-oriented execution model and the at least one event-based execution model while these models are concurrently executing, wherein the computer-implemented operation is modeled by the combination of the at least one process-oriented execution model and the at least one event-based execution model, the bridge is configured to send events both to and from the at least one process-oriented execution model and the at least one event-based execution model, and the bridge transforms events sent between the at least one process-oriented execution model and the at least one event-based execution model to match the respective forms of the at least one process-oriented execution model and the at least one event-based execution model.

12. The computer program product of claim 11, wherein the computer hardware system is further configured to perform:

evaluating the computer-implemented operation;

generating, based upon the evaluation, a process model;

transforming a first portion of the process model into the at least one process-oriented execution model; and transforming a second portion of the process model into the at least one event-based execution model, wherein the process model is transformed using:

a marker configured to mark first and second parts of the process model, a process-to-process transformer for transforming the first parts into the at least one process-oriented execution model; and a process-to-event transformer for transforming the second parts into at least one event-based execution model.

13. The computer program product of claim 11, wherein the at least one process-oriented execution model generates, during execution, process flows; and the at least one event-based execution model generations, during execution, event flows.

14. The computer program product of claim 13, wherein the computer hardware system is further configured to perform simultaneously monitoring and analyzing, using the bridge, the process flows and the event flows.

\* \* \* \* \*